US010414396B2

(12) United States Patent
Kokido et al.

(10) Patent No.: US 10,414,396 B2
(45) Date of Patent: Sep. 17, 2019

(54) LANE DIVISION LINE RECOGNITION APPARATUS, LANE DIVISION LINE RECOGNITION METHOD, DRIVING ASSIST APPARATUS INCLUDING LANE DIVISION LINE RECOGNITION APPARATUS, AND DRIVING ASSIST METHOD INCLUDING LANE DIVISION LINE RECOGNITION METHOD

(71) Applicant: Mitsubishi Electric Corporation, Tokyo (JP)

(72) Inventors: Noritaka Kokido, Tokyo (JP); Takuya Taniguchi, Tokyo (JP); Nariaki Takehara, Tokyo (JP); Kunio Ueda, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/582,948

(22) Filed: May 1, 2017

(65) Prior Publication Data

US 2018/0134289 A1 May 17, 2018

(30) Foreign Application Priority Data

Nov. 16, 2016 (JP) ................................ 2016-222913

(51) Int. Cl.
*G06K 9/00* (2006.01)
*B60W 30/12* (2006.01)
(Continued)

(52) U.S. Cl.
CPC ............ *B60W 30/12* (2013.01); *B60W 50/14* (2013.01); *B62D 6/00* (2013.01); *B62D 15/025* (2013.01);
(Continued)

(58) Field of Classification Search
CPC .................... B60W 2420/42; B60W 2050/143
See application file for complete search history.

(56) References Cited

U.S. PATENT DOCUMENTS

2012/0062747 A1* 3/2012 Zeng ..................... B60W 40/06
348/149
2015/0258936 A1* 9/2015 Takaki ..................... B60R 1/00
348/148
(Continued)

FOREIGN PATENT DOCUMENTS

JP 6-289121 A 10/1994
JP 2008-134165 A 6/2008
(Continued)

OTHER PUBLICATIONS

A. leng. "A new Multi-Lanes Detection Using Multi-Camera for Robust Vehicle Location" IEEE, p. 7, DOI: 10.1109/IVS.2005. 1505185 . (Year: 2005).*

(Continued)

*Primary Examiner* — Oneal R Mistry
(74) *Attorney, Agent, or Firm* — Sughrue Mion, PLLC; Richard C. Turner

(57) ABSTRACT

The apparatus includes: a frontward imaging unit configured to capture an image ahead of the moving body; a frontward division line detection unit configured to detect a shape of a division line of a road surface, from the captured image, and calculate reliability of a frontward division line shape; a periphery imaging unit configured to capture an image of a periphery of the moving body; a periphery division line detection unit configured to detect a shape of the division line on the road surface, from the captured image, and calculate reliability of a periphery division line shape; and a division line shape determination unit configured to determine the shape of the division line on the road surface where the moving body moves, by selecting one from or combining the frontward division line shape and the periphery division line shape, based on first reliability and second reliability.

19 Claims, 4 Drawing Sheets

(51) Int. Cl.
  *G06T 7/70*   (2017.01)
  *B60W 50/14*  (2012.01)
  *B62D 15/02*  (2006.01)
  *B62D 6/00*   (2006.01)

(52) U.S. Cl.
  CPC ............ *G06K 9/00798* (2013.01); *G06T 7/70* (2017.01); *B60W 2050/143* (2013.01); *B60W 2420/42* (2013.01)

(56) References Cited

U.S. PATENT DOCUMENTS

| | | | |
|---|---|---|---|
| 2016/0121889 A1* | 5/2016 | Shimomura | B60W 50/14 701/41 |
| 2018/0046867 A1* | 2/2018 | Yang | B60R 1/00 |

FOREIGN PATENT DOCUMENTS

| | | |
|---|---|---|
| JP | 2008-250904 A | 10/2008 |
| JP | 2010-69921 A | 4/2010 |
| JP | 2010-79573 A | 4/2010 |
| JP | 2010-173544 A | 8/2010 |
| JP | 2012-73821 A | 4/2012 |
| JP | 2013-185871 A | 9/2013 |
| JP | 2014-26396 A | 2/2014 |

OTHER PUBLICATIONS

Communication dated Jan. 9, 2018 from the Japanese Patent Office in counterpart application No. 2016-222913.

\* cited by examiner

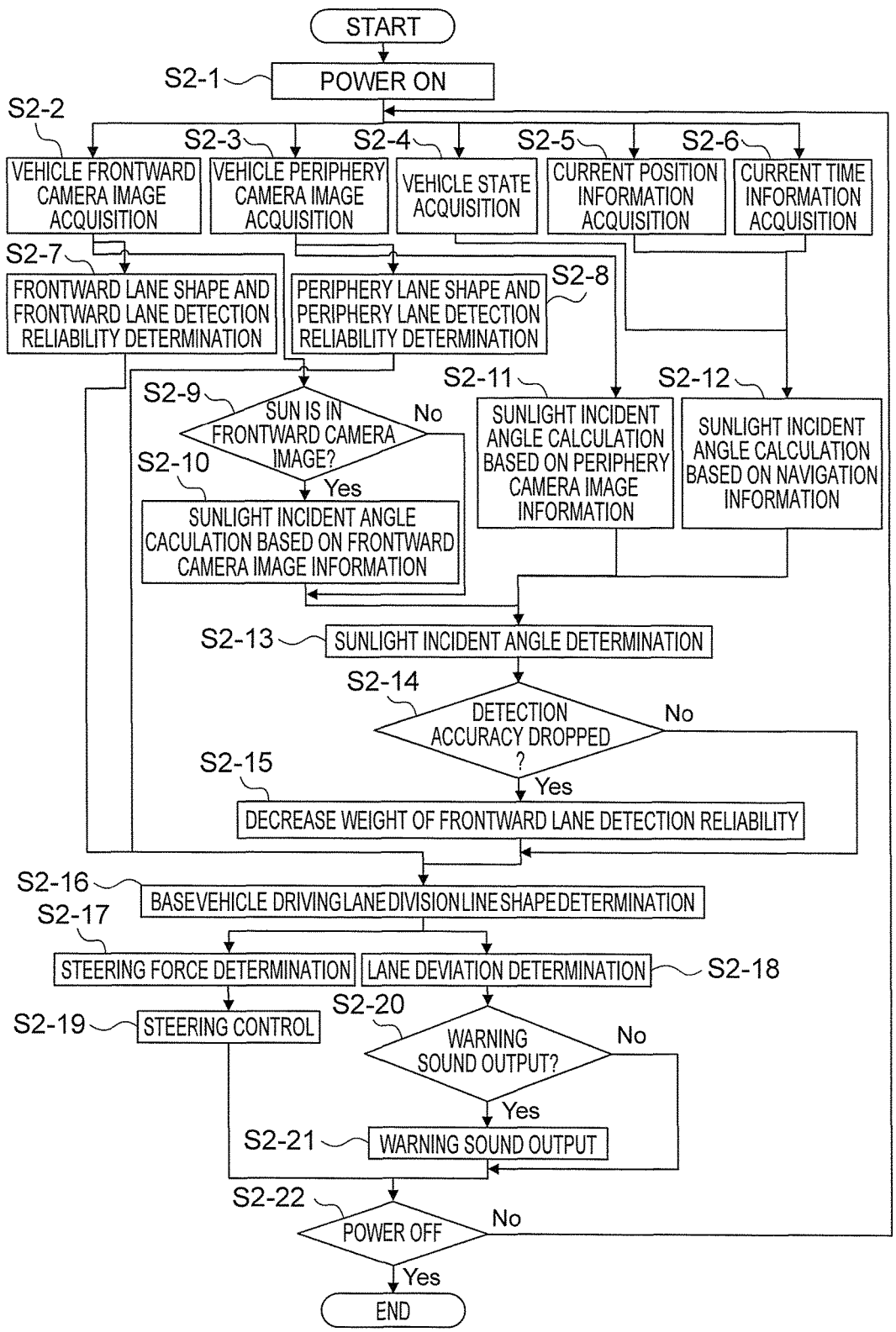

LANE DIVISION LINE RECOGNITION APPARATUS, LANE DIVISION LINE RECOGNITION METHOD, DRIVING ASSIST APPARATUS INCLUDING LANE DIVISION LINE RECOGNITION APPARATUS, AND DRIVING ASSIST METHOD INCLUDING LANE DIVISION LINE RECOGNITION METHOD

BACKGROUND OF THE INVENTION

1. Field of the Invention

The present invention relates to a lane division line recognition apparatus for recognizing a shape of a division line, which is a boundary line on the surface of a road where a moving body, such as a vehicle, moves, by using an image captured by an imaging unit disposed on the moving body, a lane division line recognition method, a driving assist apparatus including the lane division line recognition apparatus, and a driving assist method including the lane division line recognition method.

2. Description of the Related Art

A conventional lane division line recognition apparatus recognizes the shape of the division line on a road surface where a moving body moves, using an imaging unit, such as a camera, disposed on the moving body. A conventional driving assist apparatus assists in the steering operation performed by a driver based on the recognition result of a lane division line recognition apparatus, and warns the driver if it is highly possible that the vehicle will deviate away from the division line.

Therefore in the driving assist apparatus, the recognition precision of the lane division line recognition apparatus, to recognize the shape of the division line on the road surface where the moving body moves, becomes important. Hereafter, the assist of the steering operation may be called lane keep assist (LKA) control, and the warning to the driver may be called land departure warning (LDW) control.

For the image captured by the imaging unit which captures an image ahead of the moving body, a technique to recognize the shape of the division line by linear approximation in an image area capturing the road surface near the moving body, and to recognize the division line by curve approximation in an image area capturing the road surface distant from the moving body, has been proposed to improve the precision in recognizing the shape of the division line (e.g. Japanese Patent Application Laid-open No. 2014-26396).

SUMMARY OF THE INVENTION

In the case of the prior art disclosed in Japanese Patent Application Laid-open No. 2014-26396, however, the imaging unit disposed in the front part of the moving body captures an image at a distance, which corresponds to a predetermined distance from the moving body, hence resolution is not very high in the portion of the captured image near the moving body.

Further, in the captured image, the closest position to the moving body, which is the position of the lower end of the image, is still actually several meters ahead of the moving body. Therefore a recognition error may be generated in the offset distance and inclination between the division line near the front end of the moving body and the moving body.

Furthermore, when the shape of the division line is recognized using the image captured by the imaging unit disposed in the front part of the moving body in an environment of a dirty windshield of the moving body, inclement weather, backlight and the like, the shape recognition accuracy will drop due to the dirty windshield and other influences of the environment.

With the foregoing in view, it is an object of the present invention to provide a lane division line recognition apparatus, which can accurately recognize the shape of the division line on the road surface where the moving body moves.

A lane division line recognition apparatus according to this invention is a lane division line recognition apparatus recognizing a shape of a division line on a road surface where a moving body moves, including: a frontward imaging unit configured to capture an image ahead of the moving body; a frontward division line detection unit configured to detect a shape of a division line on a road surface, as a frontward division line shape, from the image captured by the frontward imaging unit, and calculate reliability of the frontward division line shape as first reliability; a periphery imaging unit configured to capture an image of a periphery of the moving body; a periphery division line detection unit configured to detect a shape of the division line on the road surface, as a periphery division line shape, from the image captured by the periphery imaging unit, and calculate reliability of the periphery division line shape as second reliability; and a division line shape determination unit configured to determine the shape of the division line on the road surface where the moving body moves, by selecting one from or combining the frontward division line shape and the periphery division line shape, based on the first reliability and the second reliability.

According to the lane division line recognition apparatus of this invention: the frontward division line detection unit captures an image ahead of the moving body; the frontward division line detection unit detects a shape of a division line on a road surface as a frontward division line shape from the image captured by the frontward imaging unit, and calculates reliability of the frontward division line shape as first reliability; the periphery imaging unit captures an image of a periphery of the moving body; the periphery division line detection unit detects a shape of the division line on the road surface as a periphery division line shape, from the image captured by the periphery imaging unit, and calculates reliability of the periphery division line shape as second reliability; and the division line shape determination unit determines the shape of the division line on the road surface where the moving body moves, by selecting one from or combining the frontward division line shape and the periphery division line shape, based on the first reliability and second reliability.

Therefore the shape of the division line on the road surface where the moving body moves can be accurately recognized.

BRIEF DESCRIPTION OF THE DRAWINGS

FIG. 4 is a flow chart depicting a driving assist apparatus to which the lane division recognition apparatus according to Embodiment 2 of this invention is applied.

DESCRIPTION OF THE PREFERRED EMBODIMENTS

A lane division line recognition apparatus, a lane division line recognition method, a driving assist apparatus including the lane division line recognition apparatus, and a driving assist method including the lane division recognition method, will be described with reference to the drawings, and in each drawing a same or corresponding portion is denoted with a same reference sign.

This invention is appropriate for a driving assist apparatus for example, which is installed in a vehicle to assist driving of the vehicle, and the driving assist method thereof. In the following embodiments, a case of installing the driving assist apparatus in a vehicle will be described as an example.

Embodiment 1

Figure 1:
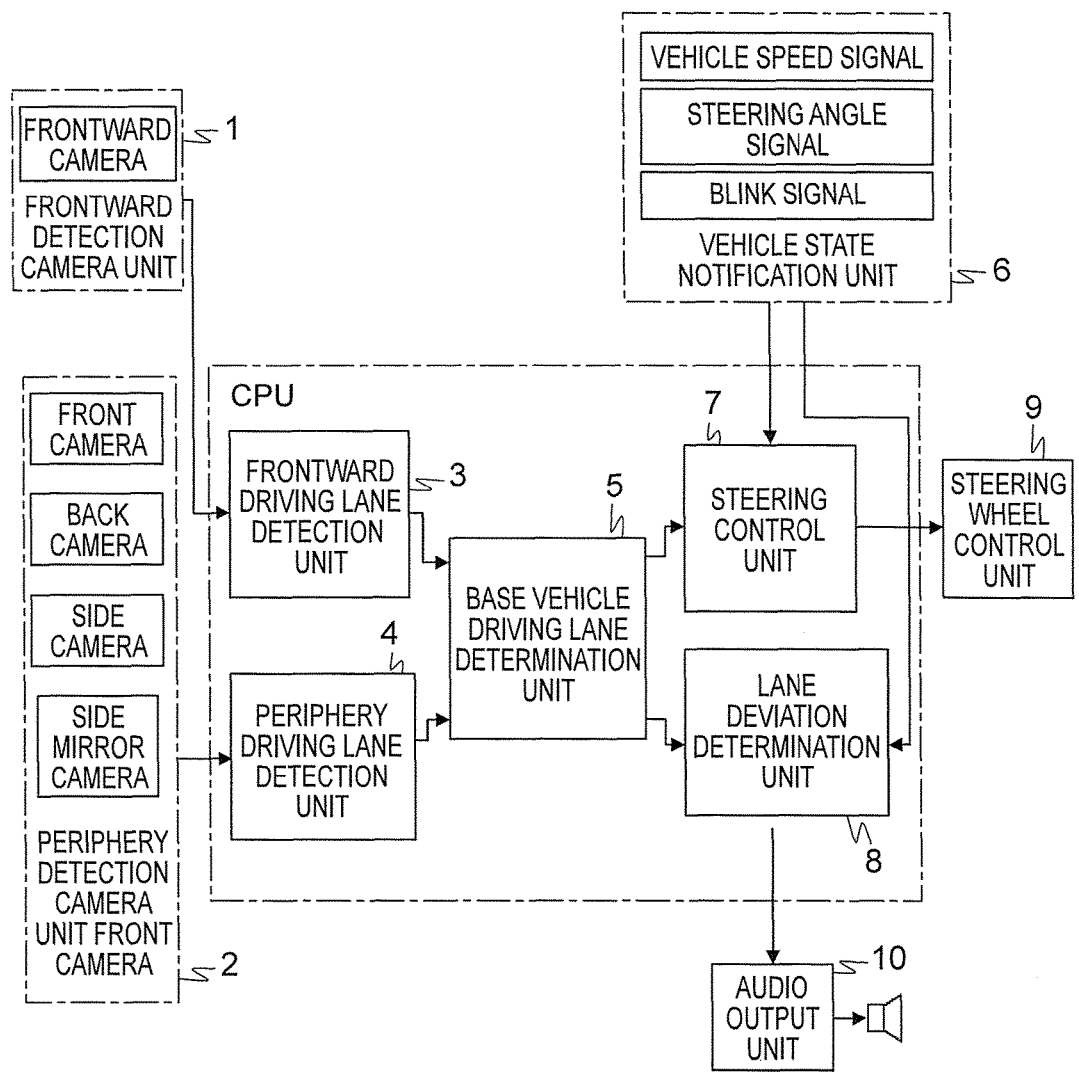
FIG. 1 is a block diagram depicting a driving assist apparatus to which the lane division recognition apparatus according to Embodiment 1 of this invention is applied.

FIG. 1 is a block diagram depicting a driving assist apparatus to which the lane division line recognition apparatus, according to Embodiment 1 of this invention, is applied. In FIG. 1, the driving assist apparatus includes a frontward detection camera unit 1, a periphery detection camera unit 2, a frontward driving lane detection unit 3, a periphery driving lane detection unit 4, a base vehicle driving lane determination unit 5, a vehicle state notification unit 6, a steering control unit 7, a lane deviation determination unit 8, a steering wheel control unit 9, and an audio output unit 10.

The frontward driving lane detection unit 3, the periphery driving lane detection unit 4, the base vehicle driving lane determination unit 5, the steering control unit 7, and the lane deviation determination unit 8 are implemented by a central processing unit (CPU), which executes arithmetic processing, and these blocks are stored in a storage unit (not illustrated) as software.

The frontward detection camera unit 1 acquires an image ahead of the vehicle where the vehicle moves using a monocular camera or a plurality of optical cameras installed in the vehicle, and notifies the image to the frontward driving lane detection unit 3.

The periphery detection camera unit 2 acquires an image of the periphery of the vehicle using one or a plurality of optical cameras, installed outside the vehicle, such as a front camera, a back camera, a side camera and a side mirror camera, and notifies the image to the periphery driving lane detection unit 4.

The frontward driving lane detection unit 3 performs image recognition on the image ahead of the vehicle acquired from the frontward detection camera unit 1, and detects the division lines on the left and right of the lane where the base vehicle is driving, as the base vehicle frontward lane shape (frontward division line shape), and calculates the reliability of the detected division line result as the frontward lane detection reliability (first reliability). Here as an example of a concrete division line detection method, Sobel filter processing is performed in the lateral direction, whereby the division line is detected based on the feature points of the edges, and the shape of the detected division line is calculated.

An example of the method for calculating the reliability of the detected division line result is that reliability is determined in 11 levels, 0 to 10, based on a number of edge feature points used for detection, validity of the division line shape, validity of the left and right division line shapes, validity of the division lines detected in the past and the like. 0 indicates the lowest reliability, which means that the likelihood of the detection result is low, and 10 indicates the highest reliability, which means that the likelihood of the detection result is high.

The methods for calculating and expressing the reliability described in Embodiment 1 are examples, and any index may be used for expressing the reliability if the likelihood of the detection result can be indicated. The frontward driving lane detection unit 3 notifies the calculated base vehicle frontward lane shape and the frontward lane detection reliability to the base vehicle driving lane determination unit 5.

The periphery driving lane detection unit 4 performs image recognition on the image of the periphery of the vehicle acquired from the periphery detection camera unit 2, and detects the division lines on the left and right of the lane where the base vehicle is driving, as the base vehicle periphery lane shape (periphery division line shape), and calculates the reliability of the detected division line result as the periphery lane detection reliability (second reliability).

Here as an example of a concrete division line detection method, Sobel filter processing is performed in the direction along the outside of the vehicle using the left and right side cameras and side mirror cameras, and Sobel filter processing is performed in the lateral direction using the front camera and the back camera, and feature points of the edges are extracted from each camera image. Furthermore, the division line is detected based on the feature points of the edges extracted from each camera image, and the shape of the detected division line is calculated.

To calculate the shape of the division line, the offset distance between the base vehicle and the division line and the inclination of the division line are determined based on the edge feature points of the side camera image, and the curve components of the division line are determined based on the edge feature points of the front camera image.

An example of the method for calculating the reliability of the detected division line result is that the reliability is determined at 11 levels, 0 to 10, based on a number of edge feature points used for detection, the validity of the division line shape, the validity of the left and right division line shapes, the validity of the division lines detected in the past and the like. 0 indicates the lowest reliability, which means that the likelihood of the detection result is low, and 10 indicates the highest reliability, which means that the likelihood of the detection result is high.

The methods for calculating and expressing the reliability described in Embodiment 1 are examples, and any index may be used for expressing the reliability if the likelihood of the detection result can be indicated. The periphery driving lane detection unit 4 notifies the calculated base vehicle periphery lane shape and the periphery lane detection reliability to the base vehicle driving lane determination unit 5.

The base vehicle driving lane determination unit 5 determines the division line shape of the base vehicle driving lane by combining the base vehicle frontward lane shape, calculated by the frontward driving lane detection unit 3, and the base vehicle periphery lane shape, calculated by the periphery driving lane detection unit 4, based on the frontward lane detection reliability calculated by the frontward driving lane detection unit 3 and the periphery lane detection reliability calculated by the periphery driving lane detection unit 4.

When the division line shape is determined here, the periphery detection camera unit 2 captures an image of the periphery of the base vehicle, so that the offset distance between the base vehicle and the division line and the inclination of the division line can be accurately calculated. For this, a weight is added to the periphery lane detection reliability on the offset distance between the offset distance between the base vehicle and the division line and the inclination of the division line, in other words, the weight value of the periphery lane detection reliability on the offset distance and the inclination of the division line is increased, so that the base vehicle periphery lane shape is more easily reflected with higher reliability.

For the curve components of the division line, on the other hand, the periphery detection camera unit 2 decreases the weight of the periphery lane detection reliability because accuracy is low, which means that the weight value of the periphery lane detection reliability in the curve components is decreased, so that the base vehicle periphery lane shape is less easily reflected.

A concrete example of determining the division line shape of the base vehicle driving lane is that the base vehicle frontward lane shape reflection ratio of the offset distance between the base vehicle and the division line and the inclination of the division line is set as: base vehicle frontward lane shape reflection ratio=frontward lane detection reliability/(frontward lane detection reliability+periphery lane detection reliability×weight value of periphery lane detection reliability of offset distance and inclination of division line).

The base vehicle periphery lane shape reflection ratio of the offset distance between the base vehicle and the division line and the inclination of the division line is set as: base vehicle periphery lane reflection ratio=(periphery lane detection reliability×weight value of periphery lane detection reliability of offset distance and inclination of division line)/(frontward lane detection reliability+periphery lane detection reliability×weight value of periphery lane detection reliability of offset distance and inclination of division line).

The base vehicle frontward lane shape reflection ratio of the curve components of the division line is set as: base vehicle frontward lane shape reflection ratio=frontward lane detection reliability/(frontward lane detection reliability+periphery lane detection reliability×weight value of periphery lane detection reliability of curve components).

The base vehicle periphery lane shape reflection ratio of the curve components of the division line is set as: base vehicle periphery lane shape reflection ratio=(periphery lane detection reliability×weight value of periphery lane detection reliability of curve components)/(frontward lane detection reliability+periphery lane detection reliability×weight value of periphery lane detection reliability of curve components).

Here it is assumed that the frontward lane detection reliability is 4 out of 11 levels, the periphery lane detection reliability is 8 out of 11 levels, the weight value of the periphery lane detection reliability of the offset distance between the base vehicle and the division line and the inclination of the division line is 2, and the weight value of the periphery lane detection reliability of the curve components of the division line is 0.25.

In this case, the base vehicle frontward lane shape reflection ratio of the offset distance between the base vehicle and the division line and the inclination components of the division line is 0.2, the base vehicle periphery lane shape reflection ratio of the offset distance between the base vehicle and the division line and the inclination components of the division line is 0.8, the base vehicle frontward lane shape reflection ratio of the curve components of the division line is 0.67, and the base vehicle periphery lane shape of the curve components of the division line is 0.33.

The base vehicle driving lane determination unit 5 determines the division line shape of the base vehicle driving lane by combining the base vehicle frontward lane shape and the base vehicle periphery lane shape according to the calculated reflection ratios. In the case of selecting one of the base vehicle frontward lane shape and the base vehicle periphery lane shape, the reflection ratio of the shape to be selected is set to 1, and the reflection ratio of the shape not to be selected is set to 0, whereby the selection is enabled.

The division line shape determination method described in Embodiment 1 is an example, and the method for determining the division line shape by combining the base vehicle frontward lane shape and the base vehicle periphery lane shape based on the frontward lane detection reliability and the periphery lane detection reliability, is not limited to this example. The base vehicle driving lane determination unit 5 notifies the calculated base vehicle lane shape to the steering control unit 7 and the lane deviation determination unit 8.

The vehicle state notification unit 6 acquires Controller Area Network (CAN) signals, such as a vehicle speed signal, a steering angle signal, a blinker signal and a reverse signal, and notifies the signal to the steering control unit 7 and the lane deviation determination unit 8.

The steering control unit 7 determines the steering force based on the base vehicle lane shape acquired from the base vehicle driving lane determination unit 5 and the CAN information acquired from the vehicle state notification unit 6, so that the base vehicle can drive safely in a driving area between the left and right division lines. The steering control unit 7 notifies the determined steering force to the steering wheel control unit 9.

The lane deviation determination unit 8 notifies the audio output unit 10 to output a warning sound when it is determined that the base vehicle may deviate or is about to deviate away from the driving area between the left and right division lines based on the base vehicle lane shape acquired from the base vehicle driving lane determination unit 5 and the CAN information acquired from the vehicle state notification unit 6.

The steering wheel control unit 9 controls steering so that the steering force specified by the steering control unit 7 is maintained. The audio output unit 10 outputs the warning sound through a speaker when the notification to output the warning sound is received from the lane deviation determination unit 8.

Figure 2:
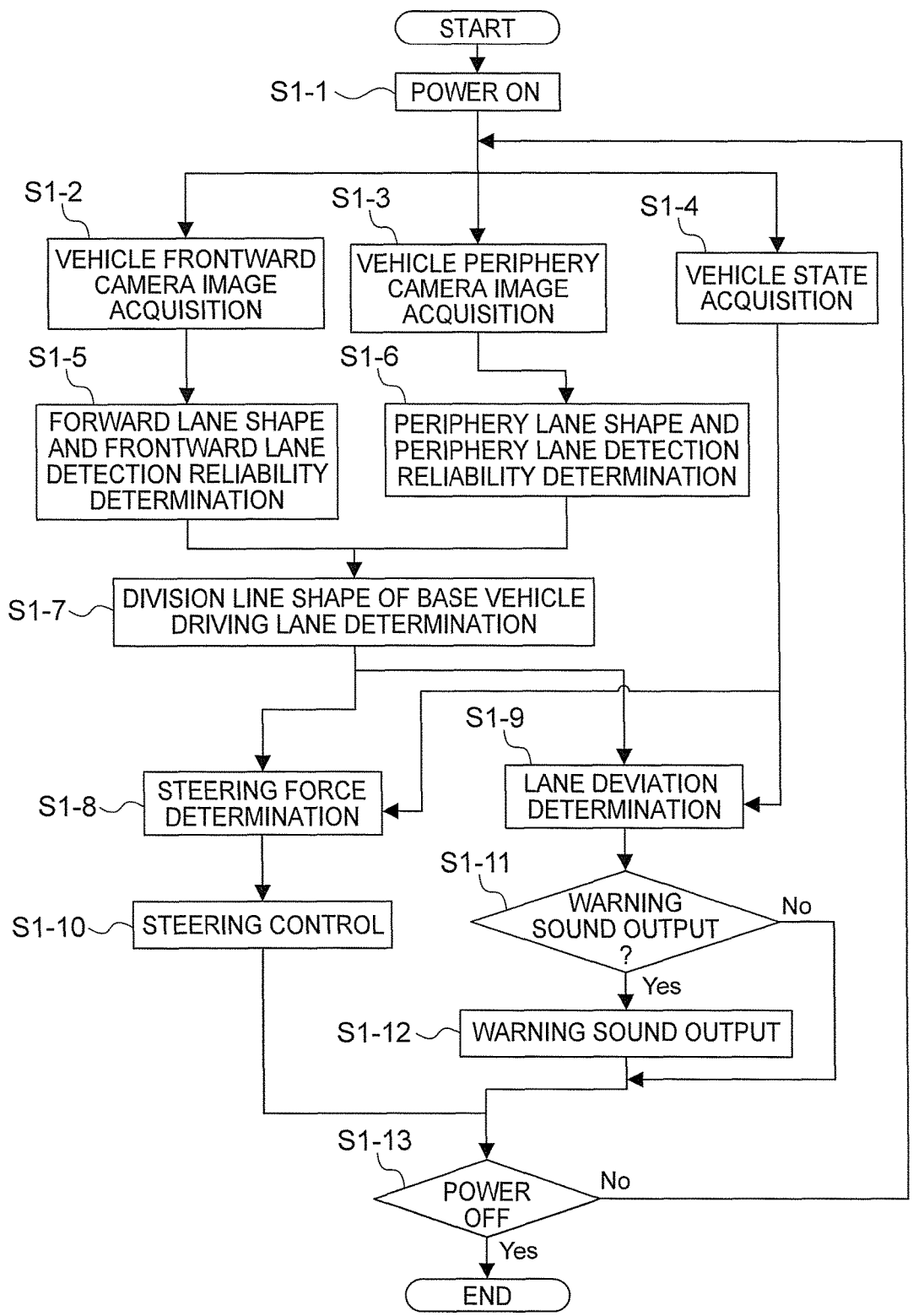
FIG. 2 is a flow chart depicting an operation of the driving assist apparatus to which the lane division line recognition apparatus according to Embodiment 1 of this invention is applied.

The operation of a driving assist apparatus, to which the lane division line recognition apparatus according to Embodiment 1 of this invention is applied, will be described next with reference to the flow chart in FIG. 2.

First when the power of the vehicle is turned ON (step S1-1), a vehicle frontward camera image, a vehicle periphery camera image and vehicle state information are acquired.

In concrete terms, the vehicle frontward camera image is acquired by the frontward detection camera unit 1 constituted by a monocular camera or a plurality of optical cameras (step S1-2), and is notified to the frontward driving lane detection unit 3.

The vehicle periphery camera image is acquired by the periphery detection camera unit 2, which is constituted by one or a plurality of optical cameras, such as a front camera, a back camera, a side camera and a side mirror camera, which are installed outside the vehicle (step S1-3), and is notified to the periphery driving lane detection unit 4.

For the vehicle state information, a vehicle speed signal, a steering angle signal, a blinker signal and a reverse signal are acquired by the vehicle state notification unit 6 from the vehicle, and the vehicle state, such as driving speed, advancing direction and blinker signal ON/OFF, is determined (step S1-4). The determined vehicle state is notified to the steering control unit 7 and the lane deviation determination unit 8.

Then the frontward driving lane detection unit 3 performs image recognition on the vehicle frontward image acquired from the frontward detection camera unit 1, and detects the left and right division lines of the lane where the base vehicle is driving, as the base vehicle frontward lane shape, and calculates the reliability of the detected division line result as the frontward lane detection reliability (step S1-5). The calculated base vehicle frontward lane shape and the frontward lane detection reliability are notified to the base vehicle driving lane determination unit 5.

Then the periphery driving lane detection unit 4 performs image recognition on the vehicle periphery image acquired from the periphery detection camera unit 2, and detects the left and right division lines of the lane where the base vehicle is driving, as the base vehicle periphery lane shape, and calculates the reliability of the detected division line result as the periphery lane detection reliability (step S1-6). The calculated base vehicle periphery lane shape and the periphery lane detection reliability are notified to the base vehicle driving lane determination unit 5.

The base vehicle driving lane determination unit 5 specifies the division line shape of the base vehicle driving lane by combining the base vehicle frontward lane shape, calculated by the frontward driving lane detection unit 3, and the base vehicle periphery lane shape, calculated by the periphery driving lane detection unit 4, based on the frontward lane detection reliability calculated by the frontward driving lane detection unit 3 and the periphery lane detection reliability calculated by the periphery driving lane detection unit 4 (step S1-7). The specified base vehicle lane shape is notified to the steering control unit 7 and the lane deviation determination unit 8.

The steering control unit 7 determines the steering force based on the base vehicle lane shape acquired from the base vehicle driving lane determination unit 5 and the CAN information acquired from the vehicle state notification unit 6, so that the base vehicle can drive safely in a driving area between the left and right division lines (step S1-8). The determined steering force is notified to the steering wheel control unit 9.

The lane deviation determination unit 8 determines whether the base vehicle is about to deviate away from the area, where the vehicle is to drive, between the left and right division lines based on the base vehicle lane shape acquired from the base vehicle driving lane determination unit 5 and the CAN information acquired from the vehicle state notification unit 6 (step S1-9). The lane deviation determination result is notified to the audio output unit 10.

The steering wheel control unit 9 controls the steering wheel so that the steering force specified by the steering control unit 7 is deployed (step S1-10).

The audio output unit 10 determines whether notification to output the warning sound is received from the lane deviation determination unit 8 (step S1-11), and outputs the warning sound through the speaker only when the notification is received (step S1-12).

After the above mentioned LKA control processing in step S1-10 and the LDW control processing in step S1-12, it is determined whether the power of the vehicle is turned OFF (step S1-13), and if the power of the vehicle is still ON, processing returns to step S1-2 again, and processing operations from step S1-2 are repeated until the power of the vehicle is turned OFF. When the power of the vehicle is turned OFF, all processing operations end.

Since the periphery detection camera unit 2 captures images of the periphery of the base vehicle like this, the offset distance between the base vehicle and the division line, and the inclination between the base vehicle and the division line, can be accurately calculated. Therefore the driving lane shape of the base vehicle can be accurately detected by detecting the base vehicle driving lane shapes from the images captured by the frontward detection camera unit 1 and the periphery detection camera unit 2 respectively, and combining the driving lane shapes detected from the frontward detection camera image and the periphery detection camera image, and as a result, accurate LKA control and LDW control can be executed.

As described above according to Embodiment 1, the frontward imaging unit captures an image ahead of the moving body; the frontward division line detection unit detects the shape of the division line on the road surface, as the frontward division line shape, from the image captured by the frontward imaging unit, and calculates the reliability of the frontward division line shape as the first reliability; the periphery imaging unit captures an image of the periphery of the moving body; the periphery division line detection unit detects the shape of the division line on the road surface, as the periphery division line shape, from the image captured by the periphery imaging unit, and calculates the reliability of the periphery division line shape as the second reliability; and the division line shape determination unit determines the shape of the division line on the road surface where the moving body moves by selecting one from or combining the frontward division line shape and the periphery division line shape based on the first reliability and the second reliability.

As a result, the driving lane shape of the base vehicle can be accurately detected by detecting the respective driving lane of the base vehicle from the images captured by the frontward detection camera unit 1 and the images captures by the periphery detection camera unit 2, which have having mutually different distances to the detection target and angles of view of the camera, and combining the driving lanes detected from the frontward detection camera image and the periphery detection camera image.

In other words, the shape of the division line on the road surface where the moving body moves can be accurately recognized.

The division line shape determination unit determines the shape of the division line on the road surface where the moving body moves, by changing the weights used for the frontward division line shape and the periphery division line shape based on the first reliability and the second reliability.

As a result, the driving lane shape of the base vehicle can be accurately detected by calculating the division line shape of the base vehicle driving lane, so that the division line shape having higher detection reliability between the base vehicle frontward lane and the base vehicle periphery lane is more easily reflected.

The division line shape determination unit calculates the offset distance between the moving body and the division line and the inclination between the moving body and the division line, based on the frontward division line shape and the periphery division line shape.

Since the periphery detection camera unit 2 captures the image of the periphery of the base vehicle, the offset distance between the base vehicle and the division line and the inclination between the base vehicle and the division line can be accurately calculated, and as a result, the driving lane shape of the base vehicle can be accurately detected by calculating the offset distance between the base vehicle and the division line and the inclination between the base vehicle and the division line based on the base vehicle frontward lane and the base vehicle periphery lane.

The division line shape determination unit increases the reliability of the offset distance between the moving body and the division line and the inclination between the moving body and the division line, which were calculated based on the image captured by the periphery imaging unit disposed on the left side face or the left side mirror of the moving body, or on the right side face or the right side mirror of the moving body, so as to increase the weight for selecting or combining.

Since the left or right side camera can capture the image of the tire position of the base vehicle and the division line, the offset distance between the own-image and the division line and the inclination between the base vehicle and the division line can be accurately calculated, and as a result, the driving lane shape of the base vehicle can be accurately detected by increasing the reliability of the offset distance and the inclination information between the base vehicle and the division line, calculated based on the image acquired by the left or right side camera.

The driving assist apparatus of Embodiment 1 further includes: a steering assist unit configured to move the moving body according to the shape of the division line on the road where the moving body moves, determined by the division line shape determination unit; and a deviation warning unit configured to give a warning to the user of the moving body, when deviation of the moving body away from the shape of the division line on the road surface where the moving body moves, determined by the division line shape determination unit, is expected.

As a result, the base vehicle driving lane is accurately detected, whereby the performance of the LKA control and the LDW control can be improved.

Embodiment 2

Figure 3:
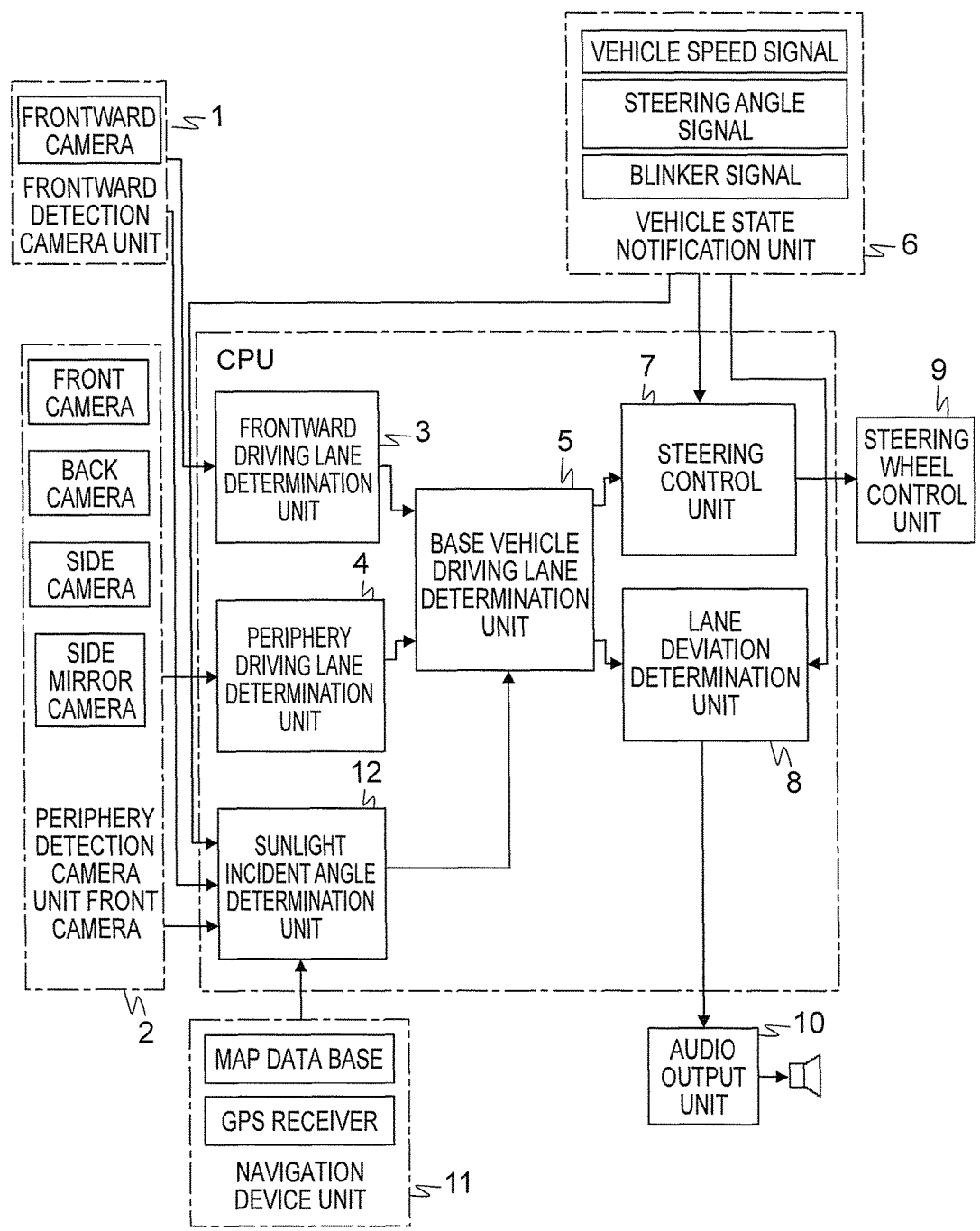
FIG. 3 is a block diagram depicting a driving assist apparatus to which the lane division recognition apparatus according to Embodiment 2 of this invention is applied.

FIG. 3 is a block diagram depicting a driving assist apparatus to which a lane division line recognition apparatus according to Embodiment 2 of this invention is applied. In FIG. 3, the driving assist apparatus includes a navigation device unit 11 and a sunlight incident angle determination unit 12, in addition to the driving assist apparatus depicted in FIG. 1. Description on the other configuration, which is the same as Embodiment 1, will be omitted here.

The frontward detection camera unit 1 acquires an image ahead of the vehicle where the vehicle moves, using a monocular camera or a plurality of optical cameras installed in the vehicle, and notifies the image to the frontward driving lane detection unit 3 and the sunlight incident angle determination unit 12.

The periphery detection camera unit 2 acquires an image of the periphery of the vehicle using one or a plurality of optical cameras installed outside the vehicle, such as a front camera, a back camera, a side camera, and a side mirror camera, and notifies the image to the periphery driving lane detection unit 4 and the sunlight incident angle determination unit 12.

The vehicle state notification unit 6 acquires CAN signals, such as a vehicle speed signal, a steering angle signal, a blinker signal and a reverse signal, and notifies the signal to the steering control unit 7, the lane deviation determination unit 8, and the sunlight incident angle determination unit 12.

The navigation device unit 11 calculates the current position information based on the latitude/longitude information acquired by a GPS receiver and map information of a map data base. The navigation device unit 11 notifies the calculated current position information and the time information acquired by the GPS receiver to the sunlight incident angle determination unit 12.

The sunlight incident angle determination unit 12 performs image recognition on the image ahead of the vehicle acquired from the frontward detection camera unit 1, and detects whether the sun exists in the image. If the sun is detected, the sunlight incident angle determination unit 12 calculates the incident angle of the sunlight with respect to the frontward camera based on the detected position in the image.

The sunlight incident angle determination unit 12 also performs image recognition on the image of the periphery of the vehicle acquired from the periphery detection camera unit 2, and detects the direction and length of the shadow of the base vehicle. Here the positional relationship between the camera and the base vehicle is known, hence the sunlight incident angle determination unit 12 estimates the position of the sun based on the detected direction and length of the shadow of the base vehicle, and calculates the incident angle of the sun with respect to the frontward camera.

Further, the sunlight incident angle determination unit 12 calculates the position of the sun, the position of the vehicle and the orientation of the vehicle, based on the current position information and time information acquired from the navigation device unit 11 and CAN information notified from the vehicle state notification unit 6. The sunlight incident angle determination unit 12 also calculates the incident angle of the sunlight with respect to the frontward camera, based on the calculated position of the sun, the position of the vehicle and the orientation of the vehicle.

In this way, the sunlight incident angle determination unit 12 accurately calculates the incident angle of the sunlight with respect to the frontward camera, by combining the incident angle of the sunlight calculated based on the position of the sunlight in the image, the incident angle of the sunlight calculated based on the direction and length of the shadow of the base vehicle, and the incident angle of the sunlight calculated using the navigation information.

In Embodiment 2, the incident angles of the sunlight calculated using the three methods are combined and used, but the incident angle of the sunlight with respect to the frontward camera may be calculated using only one method, or the incident angle of the sunlight with respect to the frontward camera may be calculated by combining two of the three methods. The calculated incident angle of the sunlight is notified to the base vehicle driving lane determination unit 5.

The base vehicle driving lane determination unit 5 determines the division line shape of the base vehicle driving lane by combining the base vehicle frontward lane shape calculated by the frontward driving lane detection unit 3 and the base vehicle periphery lane shape calculated by the periphery driving lane detection unit 4, based on the frontward lane detection reliability calculated by the frontward driving lane detection unit 3, the periphery lane detection reliability calculated by the periphery driving lane detection unit 4, and the incident angle of the sunlight calculated by the sunlight incident angle determination unit 12.

When the division line shape is determined here, if the entire captured image looks white due to backlight, which occurs depending on the incident angle of the sunlight with respect to the frontward camera, and feature quantity of the division line is difficult to be determined and detection accuracy drops, the weight of the frontward lane detection reliability is decreased so that the base vehicle frontward lane shape is reflected less in the determined division line shape.

In concrete terms, the base vehicle frontward lane shape reflection ratio of the offset distance between the base vehicle and the division line and the inclination components of the division line and the base vehicle frontward lane shape reflection ratio of the curve components of the division line, described in Embodiment 1, are multiplied by a sun incident angle weight value of the frontward lane detection reliability, which is a value to decrease the weight of the frontward lane detection reliability.

Further, the base vehicle periphery lane shape reflection ratio of the offset distance between the base vehicle and the division line and the inclination components of the division line, and the base vehicle periphery lane shape reflection ratio of the curve components of the division line, described in Embodiment 1 are respectively set to: a value generated by subtracting, from 1, the base vehicle frontward lane shape reflection ratio of the offset distance between the base vehicle and the division line and the inclination component of the division line, after the sunlight incident angle weight value of the frontward lane detection reliability is reflected; and a value generated by subtracting, from 1, the base vehicle frontward lane shape reflection ratio of the curve components of the division line, after the sun incident angle weight value of the frontward lane detection reliability is reflected. Thereby the weight of the base vehicle frontward lane shape is decreased when the division line shape is determined.

The division line shape determination method according to Embodiment 2 is an example, and is not the only method for determining the division line shape such that the weight of the frontward lane detection reliability is decreased and the base vehicle frontward lane shape is reflected less when the detection accuracy of the front camera drops due to the incident angle of the sunlight. The base vehicle driving lane determination unit 5 notifies the calculated base vehicle lane shape to the steering control unit 7 and the lane deviation determination unit 8.

The operation of a driving assist apparatus, to which the lane division line recognition apparatus according to Embodiment 2 of this invention is applied, will be described next with reference to the flow chart in FIG. 4. In Embodiment 2, step S2-5 and step S2-6, and step S2-9 to step S2-15 are added to the above mentioned Embodiment 1, and step 1-7 to step S1-13 in Embodiment 1 are changed to step 2-16 to step S2-22. In other words, processing operations other than the operation flow in step S2-5 and step S2-6 and in step S2-9 to step S2-15 are the same as Embodiment 1.

First when the power of the vehicle is turned ON (step S2-1), a vehicle frontward camera image, a vehicle periphery camera image, a vehicle state, current position information and time information are acquired.

In concrete terms, the vehicle frontward camera image is acquired by the frontward detection camera unit 1 constituted by a monocular camera or a plurality of optical cameras (step S2-2), and is notified to the frontward driving lane detection unit 3 and the sunlight incident angle determination unit 12.

The vehicle periphery camera image is acquired by the periphery detection camera unit 2, which is constituted by one or a plurality of optical cameras, such as a front camera, a back camera, a side camera and a side mirror camera, which are installed outside the vehicle (step S2-3), and is notified to the periphery driving lane detection unit 4 and the sunlight incident angle determination unit 12.

For the vehicle state information, a vehicle speed signal, a steering angle signal, a blinker signal, and a reverse signal are acquired by the vehicle state notification unit 6 from the vehicle, and the vehicle state, such as driving speed, advancing direction and blinker signal ON/OFF, is determined (step S2-4). The determined vehicle state is notified to the steering control unit 7, the lane deviation determination unit 8, and the sunlight incident angle determination unit 12.

For the current position information, the latitude/longitude information is acquired by the GPS receiver of the navigation device unit 11, and the current position information is calculated based on the latitude/longitude information and map information of the map data base (step S2-5). The calculated current position information is notified to the sunlight incident angle determination unit 12.

For the current time information, time information is acquired by the GPS receiver of the navigation device unit 11, and is notified to the sunlight incident angle determination unit 12 (step S2-6).

Then the frontward driving lane detection unit 3 performs image recognition on the vehicle frontward image acquired from the frontward detection camera unit 1, and detects the left and right division lines of the lane where the base vehicle is driving, as the base vehicle frontward lane shape, and calculates the reliability of the detected division line result as the frontward lane detection reliability (step S2-7). The calculated base vehicle frontward lane shape and the frontward lane detection reliability are notified to the base vehicle driving lane determination unit 5.

Then the periphery driving lane detection unit 4 performs image recognition on the vehicle periphery image acquired from the periphery detection camera unit 2, and detects the left and right division lines of the lane where the base vehicle is driving, as the base vehicle periphery lane shape, and calculates the reliability of the detected division line result as the periphery lane detection reliability (step S2-8). The calculated base vehicle periphery lane shape and the periphery lane detection reliability are notified to the base vehicle driving lane determination unit 5.

Then the sunlight incident angle determination unit 12 performs image recognition on the vehicle frontward image acquired from the frontward detection camera unit 1, and determines whether the sun exists in the image (step S2-9). If the sun is detected, the incident angle of the sunlight, with respect to the frontward camera, is calculated based on the detected position in the image (step S2-10).

The sunlight incident angle determination unit 12 also performs image recognition on the image of the periphery of the vehicle acquired from the periphery detection camera unit 2, and detects the direction and length of the shadow of the base vehicle. The sunlight incident angle determination unit 12 also estimates the position of the sun based on the detected direction and length of the shadow of the base vehicle, and calculates the incident angle of the sunlight with respect to the frontward camera (step S2-11).

Further, the sunlight incident angle determination unit 12 calculates the position of the sun, the position of the vehicle and the orientation of the vehicle, based on the current position information and time information acquired from the navigation device unit 11 and the CAN information notified from the vehicle state notification unit 6 (step S2-12). The sunlight incident angle determination unit 12 also calculates the incident angle of the sunlight, with respect to the frontward camera, based on the calculated position of the sun, the position of the vehicle and the orientation of the vehicle.

Then the sunlight incident angle determination unit 12 calculates the incident angle of the sunlight, by combining the incident angle of the sunlight calculated based on the position of the sun in the image, the incident angle of the sunlight calculated based on the direction and length of the shadow of the base vehicle, and the incident angle of the sunlight calculated using the navigation information (step S2-13). The calculated incident angle of the sunlight is notified to the base vehicle driving lane determination unit 5.

Then the base vehicle driving lane determination unit 5 determines whether the incident angle of the sunlight, with respect to the frontward camera, notified from the sunlight incident angle determination unit 12, negatively influences the base vehicle frontward lane shape detection accuracy (step S2-14).

If the base vehicle driving lane determination unit 5 determined that the detection accuracy drops, the weight of the frontward lane detection reliability is decreased when the division line shape of the base vehicle driving lane is specified by combining the base vehicle frontward lane shape calculated by the frontward driving lane detection unit 3 and the base vehicle periphery lane shape calculated by the periphery driving lane detection unit 4, based on the frontward lane detection reliability calculated by the frontward driving lane detection unit 3 and the periphery lane detection reliability calculated by the periphery driving lane detection unit 4 (step S2-15), whereby the division line shape of the base vehicle driving lane is specified (step S2-16).

If the base vehicle driving lane determination unit 5 determines that the detection accuracy does not drop, the division line shape of the base vehicle driving lane is specified by combining the base vehicle frontward lane shape calculated by the frontward driving lane detection unit 3 and the base vehicle periphery lane shape calculated by the periphery driving lane detection unit 4, based on the frontward lane detection reliability calculated by the frontward driving lane detection unit 3 and the periphery lane detection reliability calculated by the periphery driving lane detection unit 4 (step S2-16). The determined base vehicle lane shape is notified to the steering control unit 7 and the lane deviation determination unit 8.

The steering control unit 7 determines the steering force based on the base vehicle lane shape acquired from the base vehicle driving lane determination unit 5 and the CAN information acquired from the vehicle state notification unit 6, so that the base vehicle can drive safely in an area, where the vehicle is to drive, between the left and right division lines (step S2-17). The determined steering force is notified to the steering wheel control unit 9.

The lane deviation determination unit 8 determines whether the base vehicle is about to deviate away from the area, where the vehicle is to drive, between the left and right division lines, based on the base vehicle lane shape acquired from the base vehicle driving lane determination unit 5 and the CAN information acquired from the vehicle state notification unit 6 (step S2-18). The lane deviation determination result is notified to the audio output unit 10.

The steering wheel control unit 9 controls the steering wheel so that the steering force, specified by the steering control unit 7, is maintained (step S2-19).

The audio output unit 10 determines whether notification on output of the warning sound from the lane deviation determination unit 8 has been issued (step S2-20), and outputs the warning sound through the speaker only when the notification is received (step S2-21).

After the above mentioned LKA control processing in step S2-19 and the LDW control processing in step S2-21, it is determined whether the power of the vehicle is turned OFF (step S2-22), and if the power of the vehicle is still ON, processing returns to step S2-2 again, and processing operations from step S2-2 are repeated until the power of the vehicle is turned OFF. When the power of the vehicle is turned OFF, all processing operations end.

In this way, the sunlight incident angle determination unit 12 calculates the incident angle of the sun with respect to the frontward detection camera unit 1, and the driving lane shape detected in the periphery detection camera image is used when the detection accuracy of the frontward detection camera unit 1 is affected by backlight or the like, therefore the driving lane shape of the base vehicle can be accurately detected, and accurate LKA control and LDW control can be executed.

As described above, according to Embodiment 2, the sunlight incident angle determination unit, configured to detect an incident angle of the sunlight with respect to the frontward imaging unit, is also included, and the division line shape determination unit determines the shape of the division line on the road surface where the moving body moves, by selecting one from or combining the frontward division line shape and the periphery division line shape based on the first reliability, the second reliability and the incident angle.

As a result, even when the frontward camera is in a backlight state, the driving lane shape of the base vehicle can be accurately detected by detecting the respective driving lane of the base vehicle from the images captured by the frontward detection camera unit 1 and the periphery detection camera unit 2 having mutually different distances to the detection target and angle of view of the camera, and combining the driving lanes detected from the frontward detection camera image and the periphery detection camera image.

Further, the division line shape determination unit determines the shape of the division line on the road surface where the moving body moves, by changing the weights of the frontward division line shape and the periphery division line shape based on the incident angle.

Therefore when the frontward camera is in the backlight state and the entire captured image looks white, and the accuracy to detect the division line drops, the weight of the base vehicle driving lane calculated based on the image captured by the periphery camera is increased, and as a result, the driving lane shape of the base vehicle can be accurately detected.

The sunlight incident angle determination unit detects the position of the sun in the image captured by the frontward imaging unit, and calculates the incident angle of the sunlight based on the detected position. In order to minimize a decrease in reliability of the base vehicle frontward lane shape detected in the backlight state, it is necessary to determine whether the frontward camera was in the backlight state. In Embodiment 2, the backlight state for the frontward camera can be determined by calculating the incident angle of the sunlight based on the position of the sun in the image.

Further, the sunlight incident angle determination unit calculates the incident angle of the sunlight based on the direction and length of the shadow of the moving body in the image captured by the periphery imaging unit. Thereby the incident angle of the sunlight can be calculated based on the direction and length of the shadow of the base vehicle in the captured image, and it can be determined whether the frontward camera was in a backlight state.

Further, the sunlight incident angle determination unit calculates the incident angle of the sunlight based on the map information via the car navigation system, the position information and time information of the GPS, and the CAN information via the vehicle.

Since the position information of the base vehicle is acquired from the position information via the car navigation system, the sun position information is acquired from the time information via the GPS, and the driving direction information of the base vehicle is acquired from the CAN information of the vehicle, the incident angle of the sunlight can be calculated based on the position information, and the driving direction information of the base vehicle and sun position information, and it can be determined whether the frontward camera was in a backlight state.

The driving assist apparatus of Embodiment 2 further includes: the steering assist unit configured to move the moving body according to the shape of the division line on the road surface where the moving body moves, determined by the division line shape determination unit; and the deviation warning unit configured to give a warning to the user of the moving body, when deviation of the moving body away from the shape of the division line on the road surface where the moving body moves, determined by the divisions line shape determination unit is expected.

Thereby the base vehicle driving lane can be accurately detected, and the performance of the LKA control and the LDW control can be improved.

What is claimed is:

1. A lane division line recognition apparatus recognizing a a division line on a road surface where a moving body moves, comprising:
    a frontward imaging unit, implemented by a first camera, configured to capture an image ahead of the moving body;
    a frontward division line detection unit, implemented by a processor, configured to detect a division line on a road surface, as a frontward division line, from the image captured by the frontward imaging unit, and calculate reliability of the frontward division line as first reliability;
    a periphery imaging unit, implemented by a second camera, configured to capture an image of a periphery of the moving body;
    a periphery division line detection unit, implemented by the processor, configured to detect the division line on the road surface, as a periphery division line, from the image captured by the periphery imaging unit, and calculate reliability of the periphery division line as second reliability; and
    a division line determination unit, implemented by the processor, configured to determine the division line on the road surface where the moving body moves, by selecting one from or combining the frontward division line and the periphery division line, based on the first reliability and the second reliability,
    wherein the division line determination unit calculates an offset distance between the moving body and the division line and an inclination between the moving body and the division line, based on the frontward division line and the periphery division line, and
    wherein the division line determination unit increases the reliability of the offset distance between the moving body and the division line and the inclination between the moving body and the division line, which have been calculated based on the image captured by the periphery imaging unit disposed on a left side of the moving body or a right side of the moving body, so as to increase the weights for selecting one from or combining the frontward division line and the periphery division line.

2. The lane division line recognition apparatus according to claim 1, wherein
    the division line determination unit determines the division line on the road surface where the moving body moves, by changing weights for selecting one from or combining the frontward division line and the peripheral division line, based on the first reliability and the second reliability.

3. The lane division line recognition apparatus according to claim 1, wherein
    the division line determination unit determines the division line on the road surface where the moving body moves, based on the periphery division line, when the first reliability is lower than a value that is set in advance.

4. A driving assist apparatus, comprising:
    the line division line recognition apparatus according to claim 1; and
    a steering controller configured to move the moving body according to the division line on the road surface where the moving body moves, determined by the processor.

5. The driving assist apparatus according to claim 4, further comprising:
    an audio outputter configured to audibly output a warning to a user of the moving body, when deviation of the moving body away from the division line on the road surface where the moving body moves is expected.

6. A driving assist apparatus, comprising:
    the division line recognition apparatus according to claim 1; and
    an outputter configured to output a warning to a user of a moving body, when deviation of the moving body away from the division line on the road surface where the moving body moves is expected.

7. The lane division recognition apparatus according to claim 1, wherein the moving body is a vehicle, which is controlled by steering based on the determined division line on the road surface.

8. The lane division recognition apparatus according to claim 1, wherein the moving body is a vehicle, which outputs a warning when the vehicle deviates from a driving area based on the determined divisional line.

9. The lane division recognition apparatus according to claim 1, wherein the second camera is positioned on the moving body, which is a vehicle, and captures a plurality of images of the periphery of the vehicle and wherein the periphery division line detection unit detects a right division line and a left division line of the periphery of the vehicle.

10. A lane division line recognition apparatus recognizing a division line on a road surface where a moving body moves, comprising:
    a frontward imaging unit, implemented by a first camera, configured to capture an image ahead of the moving body:
    a sunlight incident angle determination unit configured to detect an incident angle of sunlight with respect to the frontward imaging unit;
    a frontward division line detection unit implemented by a processor, configured to detect a division line on a road surface, as a frontward division line, from the image captured by the frontward imaging unit, and calculate reliability of the frontward division line as a first reliability;

a periphery imaging unit, implemented by a second camera configured to capture an image of a periphery of the moving body;

a periphery division line detection unit, implemented by the processor, configured to detect the division line on the road surface, as a periphery division line, from the image captured by the periphery imaging unit, and calculate reliability of the periphery division line as second reliability; and a division line determination unit, implemented by the processor, configured to determine the division line on the road surface where the moving body moves, by selecting one from or combining the frontward division line and the periphery division line, based on the first reliability and the second reliability, wherein the division line determination unit determines the division line on the road surface where the moving body moves, by selecting one from or combining the frontward division line and the periphery division line based on the first reliability, the second reliability, and the incident angle, and wherein the division line determination unit determines the division line on the road surface where the moving body moves, by changing the weights for selecting one from or combining the frontward division line and the periphery division line, based on the incident angle.

11. A lane division line recognition apparatus recognizing a division line on a road surface where a moving body moves, comprising:

a frontward imaging unit, implemented by a first camera, configured to capture an image ahead of the moving body;

a sunlight incident angle determination unit configured to detect an incident angle of sunlight with respect to the frontward imaging unit;

a frontward division line detection unit, implemented by a processor, configured to detect a division line on a road surface, as a frontward division line, from the image captured by the frontward imaging unit, and calculate reliability of the frontward division line as first reliability:

a periphery imaging unit, implemented by a second camera, configured to capture an image of a periphery of the moving body;

a periphery division line detection unit, implemented by the processor, configured to detect the division line on the road surface, as a periphery division line, from the image captured reliability; and a division line determination unit implemented by the processor, configured to determine the division line on the road surface where the moving body moves, by selecting one from or combining the frontward division line and the periphery division line, based on the first reliability and the second reliability, wherein the division line determination unit determines the division line on the road surface where the moving body moves, by selecting one from or combining the frontward division line and the periphery division line based on the first reliability, the second reliability, and the incident angle, wherein the sunlight incident angle determination unit executes at least one of:

detects the position of the sun in the image captured by the frontward imaging unit, and calculates the incident angle of the sunlight, based on the detected position, calculates the incident angle of the sunlight, based on a direction and a length of a shadow of the moving body in the image captured by the periphery imaging unit, and calculates the incident angle of the sunlight, based on map information via a car navigation system, position information and time information via a GPS, and CAN information of a vehicle.

12. A lane division line recognition method for recognizing a division line on a road surface where a moving body moves, the method comprising:

capturing, using a front camera, an image ahead of the moving body;

detecting, by a processor, a division line on a road surface, as a frontward division line, from an image captured in the frontward imaging, and calculating reliability of the frontward division line as first reliability;

capturing, using a peripheral camera, an image of a periphery of the moving body;

detecting, by the processor, the division line on the road surface, as a periphery division line, from the captured image, and calculating reliability of the periphery division line as second reliability; and determining, by the processor, the division line on the road surface where the moving body moves, by selecting one from or combining the frontward division line and the periphery division line, based on the first reliability and the second reliability, wherein an offset distance between the moving body and the division line, and an inclination between the moving body and the division line, are calculated based on the frontward division line and the periphery division line, wherein reliability of the offset distance between the moving body and the division line and the reliability of the inclination between the moving body and the division line, which have been calculated by the peripheral camera disposed on a left side of the moving body or a right side of the moving body, is increased, so as to increase weights for selecting one from or combining the frontward division line and the periphery division line.

13. The lane division line recognition method according to claim 12, wherein the division line on the road surface where the moving body moves is determined by changing weights for selecting one from or combining the frontward division line and the periphery division line, based on the first reliability and the second reliability.

14. The lane division line recognition method according to claim 12, wherein the division line on the road surface where the moving body moves is determined based on the periphery division line when the first reliability is lower than a value that is set in advance.

15. A driving assist method, comprising:

the lane division line recognition method according to claim 12; and moving the moving body according to the determined division line on the road surface where the moving body moves.

16. The driving assist method according to claim 15, further comprising:

outputting a warning to a user of the moving body, when deviation of the moving body away from the determined division line on the road surface where the moving body moves is expected.

17. A driving assist method, comprising:
the lane division line recognition method according to claim 12; and
outputting a warning to a user of the moving body, when deviation of the moving body away from the determined division line on the road surface where the moving body moves is expected.

18. A lane division line recognition method for recognizing a division line on a road surface where a moving body moves, the method comprising:
capturing, using a front camera, an image ahead of the moving body;
detecting an incident angle of the sunlight with respect to the front camera;
detecting, by a processor, a division line on a road surface, as a frontward division line, from an image captured in the frontward imaging, and calculating reliability of the frontward division line as first reliability;
capturing, using a peripheral camera, an image of a periphery of the moving body;
detecting, by the processor, the division line on the road surface, as a periphery division line, from the image captured in the periphery imaging, and calculating reliability of the periphery division line as second reliability; and
determining, by the processor, the division line on the road surface where the moving body moves, by selecting one from or combining the frontward division line and the periphery division line, based on the first reliability and the second reliability,
wherein the division line on the road surface where the moving body moves is determined by selecting one from or combining the frontward division line and the periphery division line, based on the first reliability, the second reliability, and the incident angle, and
wherein the division line on the road surface where the moving body moves is determined by changing weights between the frontward division line and the periphery division line, based on the incident angle.

19. A lane division line recognition method for recognizing a division line on a road surface where a moving body moves, the method comprising:
capturing, using a front camera an image ahead of the moving body;
detecting an incident angle of the sunlight with respect to the front camera;
detecting, by a processor, a division line on a road surface, as a frontward division line, from an image captured in the frontward imaging, and calculating reliability of the frontward division line as first reliability;
capturing, using a peripheral camera, an image of a periphery of the moving body;
detecting, by the processor, the division line on the road surface, as a periphery division line , from the image captured in the periphery imaging, and calculating reliability of the periphery division line as second reliability; and
determining, by the processor, the division line on the road surface, where the moving body moves, by selecting one from or combining the frontward division line and the periphery division line, based on the first reliability and the second reliability,
wherein the division line on the road surface where the moving body moves is determined by selecting one from or combining the frontward division line and the periphery division line, based on the first reliability, the second reliability, and the incident angle,
wherein the incident angle of the sunlight is calculated by at least one of:
a position of the sun in the image, captured by the front camera, being detected, and an incident angle of the sunlight being calculated based on the detected position,
the incident angle of the sunlight being calculated based on a direction and a length of a shadow of the moving body in the image, captured by the peripheral camera, and
the incident angle of the sunlight being calculated based on map information via a card navigation system, position information and time information via a GPS, and CAN information of a vehicle.

* * * * *